May 25, 1965
H. H. PASE
3,185,173
FLOAT VALVE
Original Filed June 23, 1959
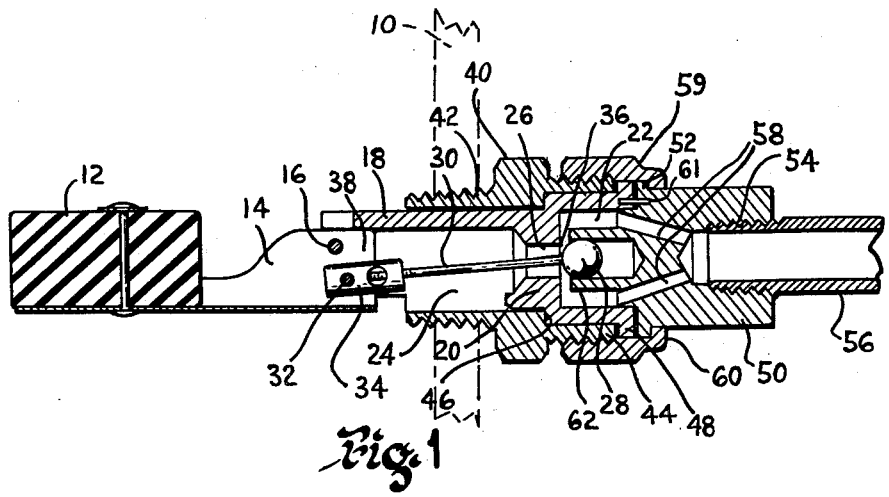
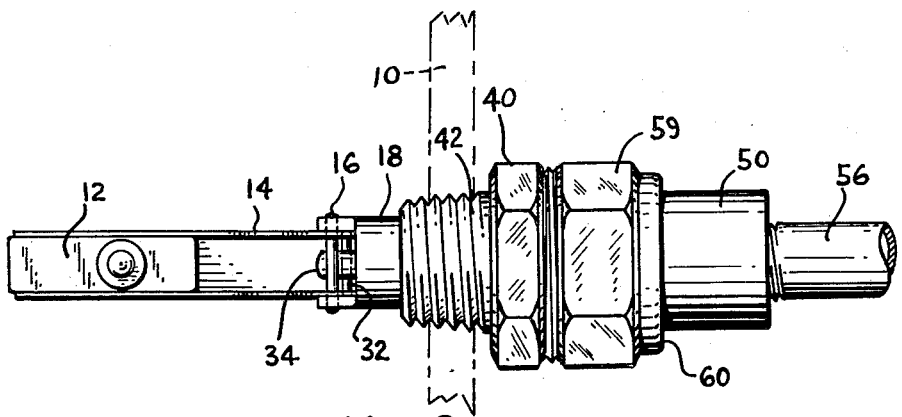
INVENTOR
HUGH H. PASE
BY Steward & Steward
his ATTORNEYS.

3,185,173
FLOAT VALVE
Hugh H. Pase, Wallingford, Conn., assignor to The Houston Company, Cheshire, Conn., a corporation of Connecticut
Original application June 23, 1959, Ser. No. 822,232, now Patent No. 3,055,405, dated Sept. 25, 1962. Divided and this application May 17, 1962, Ser. No. 195,613
2 Claims. (Cl. 137—443)

This invention relates to fluid valves and it relates more particularly to the type of valve in which the fluid controlled thereby tends to force the valve member against its seat and thereby to close the valve. This application is a division of my copending application, Ser. No. 822,232 filed June 23, 1959 for Automatic Tank-Filling Systems, now Patent No. 3,055,405, September 25, 1962.

An object of the invention is to prevent the premature closing of a valve of the above type due to a sudden surge of pressure of flow of fluid to the valve. In certain systems, such as the automatic fueling system disclosed in the patent referred to above, premature closing of a pilot-valve, for example, will cause erratic operation of the automatic components which control the flow of fuel to a tank being filled. This is highly undesirable, not only from an operational standpoint, but also from the standpoint of maintenance of the equipment, because it causes undue wear of the automatic components of the fueling system. Moreover, from an operational standpoint, it may give the operator a false indication that the tank is full, when actually it may be only partially filled. This can be serious when the prolonged operation of the engine using the fuel requires that its fuel tanks be filled to capacity before starting a run.

Another object of the invention is to provide a simplified valve-body construction which is readily mounted at any desired location in a wall, as for example a wall of a fuel tank, from the outside of the tank.

Other objects of the invention and its advantages will become apparent from the description of the embodiment of the invention shown in the accompanying drawings. While only one embodiment of the invention illustrating the principles thereof is shown and described, it will be understood of course that the invention is applicable in various types of installations and that numerous changes and modifications can be made without departing from the invention as hereinafter claimed.

In the drawings,

FIG. 1 is a view in vertical longitudinal section through a valve in accordance with the invention; and FIG. 2 is a top plan view of the valve shown in FIG. 1.

The particular embodiment of the invention disclosed in the drawings is a liquid level-sensing valve capable of use in automatic tank filling systems, such as that disclosed in my above-identified patent. In this instance, the valve is designed for installation directly through the skin of a tank 10, with a float 12 mounted at the free end of an arm 14 pivotally supported within tank 10 on a pivot pin 16 projecting outwardly on both sides of arm 14. The ends of pivot pin 16 are held within opposite walls of a hollow valve-body 18 which extends through and is secured to the wall of tank 10 in a manner to be disclosed hereinafter. The float 12 may consist of any light-weight object, such as a solid rubber cellular block as shown, or a hollow sealed float of non-corrosive metal or of one of the synthetic resins such as polyvinyl chloride and the like. Suitable means are provided for securing float 12 to the pivoted arm 14 in any desired position.

Valve-body 18 is formed with an internal partition 20 separating its hollow interior into a valve chamber 22 and an outlet passage 24. An outlet port or valve-orifice 26 between chamber 22 and passage 24 is located centrally of partition 20 for the flow of liquid from the valve chamber 22 to the passage 24 which opens directly into tank 10. A ball 28 is mounted at the free end of a valve stem 30 pivoted at its opposite end to float-arm 14, ball 28 being located on the inside of the partition 20 with valve stem 30 extending through valve-orifice 26. A pivot pin 32 connecting valve stem 30 and float-arm 14 extends outwardly on both sides of an adjusting block 34, into the end of which valve stem 30 is adjustably threaded. The outer ends of pivot pin 32 are received in opposite side walls of float-arm 14, which in this instance is channel-shaped in order to accommodate and retain both the float 12 and adjusting block 34, as shown in FIG. 2. The pivot pin 16 for the float-arm 14 is located above and is spaced from pivot pin 32 for the valve-ball assembly so that as float 12 rises from the position shown in FIG. 1 with the liquid-level in the tank, the ball 28 is drawn by the float-arm 14 and valve stem 30 inwardly into engagement with a valve seat 36 on the outer side of orifice 26 closing the latter. It will be noted that when the liquid-level in the tank drops below the position at which the level-sensing valve is located on the wall of the tank 10, the float-arm 14 is returned under its own weight and that of the float 12 to the position shown in FIG. 1, where the upper edges of the channel walls on the short end 38 of the float-arm engage the underside of the top of the valve-body 18. This prevents further counterclockwise movement of the float-arm 14, as shown in FIG. 1, and prevents possible malfunction of the valve.

By turning the valve stem 30 into or out of the adjusting block 34, the position of valve-ball 28 with respect to the valve-seat 36 is adjusted, thereby providing a limited amount of adjustment in the point at which the valve closes. This allows the full-level of the liquid in the tank to be raised or lowered somewhat without changing the location of the pilot valve.

A sleeve fitting 40 is adapted to receive within it the valve-body 18 and is provided at its inner end with pipe threads 42, by which the valve assembly may be readily mounted in the wall of the tank 10. A hole is drilled at the desired point in the wall of the tank and then tapped to receive the pipe threads 42 of fitting 40. The outside dimensions of float 12 are such that the float can be inserted through fitting 40 after the latter has been mounted on the wall of the tank. The valve-body 18 then slides within the fitting 40 until its inwardly facing peripheral shoulder 46 engages an oppositely facing internal shoulder on fitting 40. The outer end of fitting 40 is also threaded at 44 in order to receive a retaining nut 59 described hereinafter.

The outer end of valve-body 18 is provided with a peripheral flange 48, the O.D. of which is about equal to or less than the minor diameter of the threaded end 44 of fitting 40. Formed separately from, but in effect as a part of valve-body 18, is a body-plug 50, which has a peripheral flange 52 corresponding to and fitting against the flange 48 of the valve-body 18. The outer end of body-plug 50 is drilled and tapped at 54 in order to form an inlet port for the reception of the threaded end of a pipe or tube 56 which, in the fueling system disclosed in the above-mentioned patent, is a control-line to the coupling for the automatic filling nozzle. A plurality of passages 58 are drilled between the tapped bore 54 in body-plug 50 and the valve chamber 22 in the valve-body 18.

Nut 59 threadedly engages the outer end 44 of fitting 40 and is provided with an inwardly projecting flange 60 at its outer end adapted to engage the back side of the peripheral flange 52 on body-plug 50. By tightening down on nut 59, body-plug 50 is brought into rigid engagement with valve-body 18 and the body-assembly thus constituted is at the same time secured tightly to the fitting 40. If desired, a locating pin 61 may be provided between the flanges 48 and 52 of the valve-body 18 and body-plug 50, respectively, in order to properly align the float-arm 14 within the tank. It will be noted that the assembly described above not only facilitates mounting the valve in the wall of the tank, but also makes it possible to remove and replace the whole float assembly when necessary by simply sliding it out of fitting 40.

Projecting inwardly from and centrally of the inner end of body-plug 50 within valve chamber 22 is a hollow, cylindrical shield or valve-guide 62, the inner end of which surrounds the valve-ball 28 but is spaced sufficiently from partition 20 to permit flow of liquid from chamber 22 through valve-orifice 26 when valve-ball 28 is lifted by means of float assembly 12, 14 from its valve-seat 36. The outside diameter of the valve-shield 62 is substantially less than the inside diameter of valve chamber 22 in order to permit the passage of liquid from passages 58, which surround valve-shield 62, to the valve-orifice 26. The inside diameter of the cylindrical valve-shield 62 is larger than valve-ball 28 but is small enough to effectively center valve-ball 28 with respect to its seat 36 and at the same time to prevent premature or erratic seating of valve-ball 28 due to a momentary surge in the flow or pressure of the liquid in the valve chamber 22.

It will be noted from the foregoing description of one form of valve illustrating the invention that the valve-ball is acted upon in two different ways. Primarily, of course, the valve-ball is opened by valve-actuating and liquid-level sensing means, such as the valve-opening linkage and float illustrated. On the other hand, the pressure and flow of the liquid fed to the inlet side of the valve urges the valve-ball closed. However, under normal circumstances the forces exerted by the liquid on the ball are insufficient to overbalance the weight of the unimmersed float, as well as the additional force tending to keep the valve open due to the stream of liquid flowing along arm 14 and against the float. Under such circumstances the valve is held open by the float mechanism. Should there be a sudden surge of pressure at the inlet side of the valve before the float is unweighted by the liquid-level, the flow of fluid through the valve would, in the absence of shield 62, be sufficient to over-ride the float mechanism. The shield 62, however, which surrounds the valve-ball, prevents the ball from being carried along with the stream of fluid, and at the same time delays the build up of pressure behind the valve-ball. Thus, surges in the velocity and pressure of the fluid through the valve are prevented by the shield 62 from prematurely closing the valve.

On the other hand, if for some reason an overpressure of liquid is supplied to the valve for a relatively long period of time, the increased pressure of the liquid would have time to build up behind the valve-ball within the shield 62 and move the valve closed against the force of the float. This is desirable because an over-pressure of liquid to the valve could indicate a potentially dangerous or undesirable condition in the system. The abnormal closing of the pilot valve under excessive pressures can be utilized to sense such a condition immediately and to signal corrective action.

When the float device is submerged in the liquid in the tank, the float of course rises, permitting the valve-ball to move to its closed position. The pressure exerted by the jet of fluid through the outlet port in the valve is also dissipated by the liquid in the tank so that this force, which normally helps to keep the valve open, is eliminated.

It will accordingly be apparent that an important aspect of the present invention resides in the cooperative relationship of the valve-actuating and liquid-level sensing means which are primarily for opening the valve, with respect to the valve shield, which prevents premature closing of the valve.

What is claimed is:

1. A float valve for a tank-filling system comprising in combination a housing, inlet and outlet ports in said housing, a valve-seat in said outlet port, a valve-closure member supported within said housing for movement into and out of closing relation with said valve-seat, said valve-closure member being urged by the fluid in said housing into closed relation with said valve-seat, valve-actuating means comprising an arm pivoted to said valve-housing outwardly of said outlet port and in axial alignment therewith, said valve-closure member having a valve stem which extends through said outlet port and is connected to said arm such that said closure member is moved into and out of closing relation with said valve seat upon pivotal movement of said arm, a float mounted adjacent the outer end of said arm substantially in line with said outlet port such that the stream of fluid passing through said outlet port impinges on said arm and float when not immersed in the liquid in said tank and exerts a force on said arm in the direction tending to open said valve, said force being dissipated when said arm and float are immersed in liquid.

2. A valve as defined in claim 1, which further includes valve-shielding means disposed within said valve housing having a recess opening toward said valve-seat such that said valve-closure member is moved into said recess upon moving out of closing relation with said valve-seat thereby shielding said valve-closure member against the action of the fluid flowing through said valve tending to close said valve-closure member against the forces exerted on it by said float tending to open it.

References Cited by the Examiner

UNITED STATES PATENTS

| | | | |
|---|---|---|---|
| 535,878 | 3/95 | Woodward | 137—515.7 |
| 636,777 | 11/99 | Engel | 137—436 XR |
| 934,548 | 9/09 | Kriebel | 137—515.7 |
| 934,620 | 9/09 | Mueller | 251—52 XR |
| 996,099 | 6/11 | Leidecker | 137—515.7 |
| 1,122,758 | 12/14 | Hull | 137—436 XR |
| 1,161,745 | 11/15 | Springman | 137—449 |
| 1,354,311 | 9/20 | Landrum | 137—445 XR |
| 1,551,808 | 9/25 | Dixon | 137—449 |
| 1,623,374 | 4/27 | Anderson | 137—449 |
| 1,796,443 | 3/31 | Dacosta | 137—449 |

ISADOR WEIL, *Primary Examiner.*

M. CARY NELSON, WILLIAM F. O'DEA, *Examiners.*